United States Patent [19]

Harvey

[11] 4,415,245
[45] Nov. 15, 1983

[54] MOVABLE INFRARED FILTER FOR AN AUTO RANGING CAMERA

[75] Inventor: Donald M. Harvey, Webster, N.Y.

[73] Assignee: Eastman Kodak Company, Rochester, N.Y.

[21] Appl. No.: 378,670

[22] Filed: May 17, 1982

[51] Int. Cl.³ .................. G03B 3/00; G03B 15/03
[52] U.S. Cl. ................................ 354/25; 354/126
[58] Field of Search .......... 354/25, 32, 145, 35, 354/126

[56] References Cited

U.S. PATENT DOCUMENTS

| | | | |
|---|---|---|---|
| Re. 27,461 | 8/1972 | Harvey | 354/25 |
| 1,866,581 | 7/1932 | Simjian | 354/25 |
| 3,173,347 | 3/1965 | Stimson et al. | 354/25 |
| 3,438,766 | 4/1969 | Biber | 354/33 |
| 3,813,679 | 5/1974 | Hasegawa et al. | 354/25 |
| 3,843,878 | 10/1974 | Ueda et al. | 362/16 |
| 3,906,526 | 9/1975 | Toyoshima et al. | 354/149 |
| 4,066,884 | 1/1978 | Taylor | 362/16 |
| 4,067,030 | 1/1978 | Kuramoto et al. | 354/139 |
| 4,153,355 | 5/1979 | Ikawa et al. | 354/33 |
| 4,174,898 | 11/1979 | Iijima | 354/145 |
| 4,261,658 | 4/1981 | Uchiyama et al. | 354/126 |

FOREIGN PATENT DOCUMENTS

2084750 4/1982 United Kingdom .

Primary Examiner—Michael L. Gellner
Attorney, Agent, or Firm—D. R. Arndt

[57] ABSTRACT

An automatic rangefinding camera uses a light source, such as an electronic flash, to direct light toward an object to be photographed. The quantity of such light reflected by the object to be photographed is converted into an electrical signal that can be translated by a converter into ranging information. Included on the camera is a switch which, when moved to the OFF position, disables the exposure flash and simultaneously moves a filter in front of the flash tube so that invisible radiation is used for auto-ranging. When lighting conditions are such that the exposure flash is required, movement of the switch to the ON position energizes the exposure flash and at the same time moves the filter out of the light path, thus uncovering the flash tube.

4 Claims, 1 Drawing Figure

MOVABLE INFRARED FILTER FOR AN AUTO RANGING CAMERA

BACKGROUND OF THE INVENTION

1. Field of the Invention

The invention relates to still cameras and more specifically to such cameras with automatic ranging capabilities.

2. Description of the Prior Art

Various focus detectors or ranging systems have heretofore been proposed for use with cameras, to automatically determine a subject's distance from the camera and to enable automatic or manual distance adjustment of the camera's lens in accordance with the distance so determined. One of these known systems employs a flashlamp to produce a fixed quantity of light and suitable range detection circuitry to sense the quantity of flash light reflected by the subject to be photographed. The circuitry converts the sensed reflected light into an electrical signal and stores the signal in a storage capacitor; whereby the focus adjustment may be effected in accordance with the stored signal. However, use of a visible ranging flash may be undesirable because of the disturbing or disruptive effect it may have when photographing certain scenes which do not require flash illumination, e.g. religious ceremonies or theatre performances. For this reason, the use of infrared light has been suggested in the past in conjunction with automatic exposure control systems and automatic focus systems which rely on light emitted to the scene to be photographed.

In Simjian U.S. Pat. No. 1,866,581 a camera is focused automatically in response to the amount of light reflected by the subject from a fixed floodlight. Although the floodlight normally serves to provide the photographic illumination, Simjian suggests that it could be covered by an infrared filter. However, either the insertion or removal of this filter would necessitate recalibration of the electronic circuits.

Stimson U.S. Pat. No. 3,173,347, discloses a system that has two light sources; one for exposure and one for ranging. The camera has two photocells, one being sensitive to visible light or daylight and the other being sensitive only to infrared light. The photocells can be selectively interconnected to the measuring instrument so that the photocell sensitive to visible light is used for daylight operation and the photocell sensitive to infrared light is used for flash operation.

The present invention retains the advantages associated with using infrared or other radiation outside the normal sensitivity of the human vision for ranging, while using the same light source for both ranging and exposure illumination without the need to recalibrate the system when changing from one mode to the other.

SUMMARY OF THE INVENTION

The present invention is directed to a camera having flash ranging capability and provided with a switch means for disabling the main flash and simultaneously covering the single flash tube with a filter which transmits only the infrared or other invisible radiation generated by the preflash for ranging purposes. Hence, whenever flash illumination is not being employed, the ranging function is performed by means of invisible infrared light.

The aforementioned camera preferably comprises an electronic flash tube housed within the camera. Ranging means are provided for firing the flash tube to produce ranging light that is used for detecting the range of a subject from the camera by sensing the amount of light reflected to the camera by the subject. Exposure illumination means are also provided for firing the same flash tube shortly after the ranging illumination has been produced, to illuminate the subject for producing a photographic exposure. The ranging and exposure illumination means are coordinated to automatically operate sequentially. An infrared filter which is to be moved into and out of the light path of the flash tube is provided along with means for moving the filter into the light path only when the exposure illumination means is disabled. The flash illumination means may be selectively disabled either manually or automatically i.e. in high ambient light the main flash can automatically be disabled and the infrared filter can be positioned in the light path, thereby allowing the ranging means to be operated without the automatic subsequent operation of the exposure illumination means.

The above-described apparatus allows one to retain the automatic ranging feature of the camera without the disturbing or disruptive effect sometimes associated with the visible flash of light used for ranging.

Other objects and features of the present invention will become fully apparent from the following detailed description of specific embodiments thereof taken in conjunction with the accompanying drawings.

DESCRIPTION OF THE PREFERRED EMBODIMENT

Figure 1:
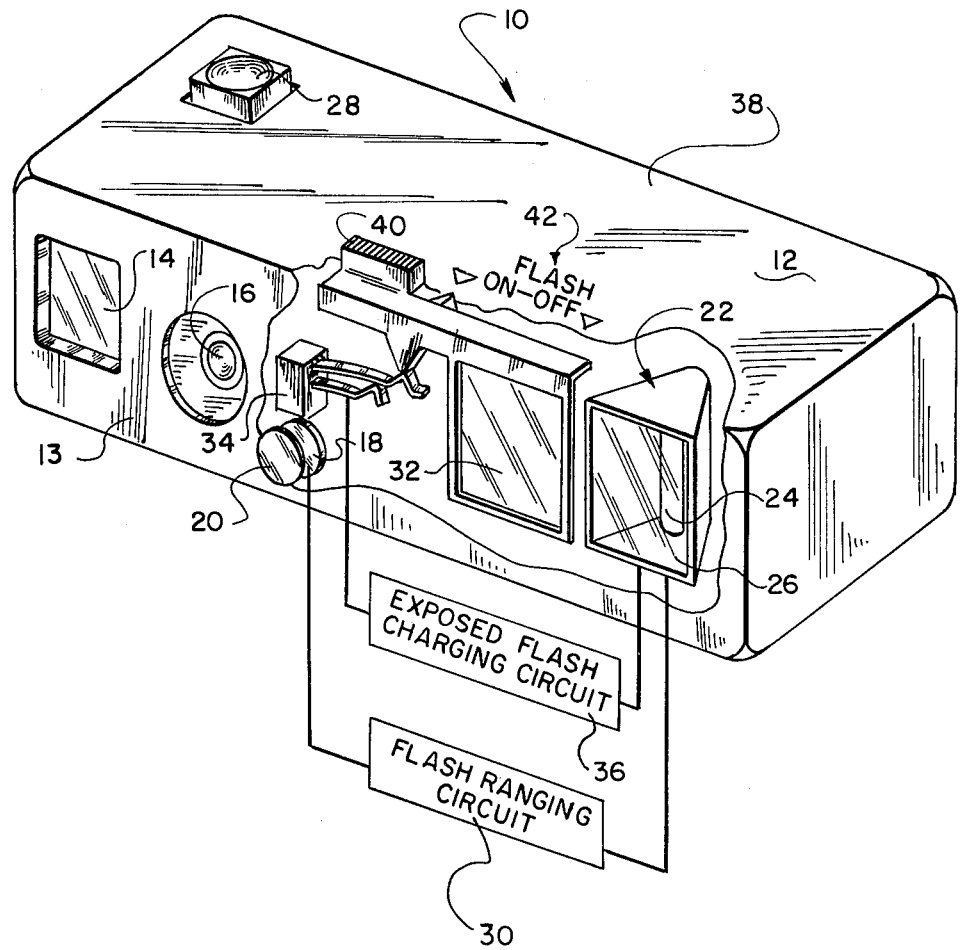
FIG. 1 shows the camera in accordance with the present invention in perspective view, with a portion of the camera housing cut away.

Because photogrphic cameras are well known, the present description will be directed in particular to the elements forming part of the present invention and its use in such photographic cameras. It will be understood that camera elements not specifically shown or described may take various forms well known to those having ordinary skill in the art.

FIG. 1 shows a camera 10, with a portion of its housing 12 partially cut away to better illustrate the operation of the components. Located in the front wall 13 of the camera are a viewfinder 14, a photographic lens 16, a light sensitive element 18 and an infrared filter 20 positioned directly in front of the light sensitive element 18. An electronic flash device 22 is also mounted in the front wall 13 of the camera and includes a flash tube 24 partially surrounded by a parabolic reflector 26 for directing light generally along the optical path of the photographic lens 16.

In general, the rangefinding apparatus operates as follows: light rays emanating from the electronic flash 22, which is actuated by a body release button 28, are allowed to impinge on the object of a photographic scene (not shown). A portion of the light rays reflected back toward the camera pass through infrared filter 20 and onto the light sensitive element 18, which may take various forms, e.g. a photovoltaic cell, photodiode, or photocell.

Also connected to the electronic flash 22 is a flash ranging circuit 30, similar to the one shown in U.S. Pat. No. 4,302,084. This circuit has two primary functions, its first function being to provide the energy necessary to fire the flash tube 24 to provide ranging light, similar to an exposure flash, but of lesser magnitude, and its second function being to detect the light reflected from the subject that falls on the photocell 18 to determine the range of the subject and to adjust an element of the camera accordingly.

Included in the flash ranging circuit 30 is an integrating capacitor (not shown), which allows the circuit to provide a measure of the total amount of light reflected by the subject. Converter means, (not shown) also included in the ranging circuit 30, translate the charge on the capacitor into a range signal that is functionally related to the distance between the camera 10 and the subject. This range signal is inputted to an adjusting mechanism (not shown) for adjusting a camera element relative to the exposure plane of a film unit to be exposed. Alternatively, the information outputted by the converter can be used to operate a readout that may be in the form of a visual display such as a digital display, a meter or an LED display. The camera operator would then be able to use this information to manually adjust a camera element as required.

Mounted just behind the front wall 13 of the camera is an infrared filter 32 which is slidably mounted for movement into and out of optical alignment with the electronic flash 22, i.e. into and out of the light path of the electronic flash. Also located behind the front wall of the camera is a normally open electrical switch 34 which, when closed, enables the exposure flash charging circuit 36 and, when open, disables that circuit.

Projecting above the top wall 36 of the camera is a slider 40 which is movable from a first position to a second position. These positions are indicated by indicia 42 on the top of the camera representing the ON and OFF states of the exposure flash charging circuit 36. When the slider pointer 41 is adjacent the OFF indicium, the exposure flash does not operate and the infrared filter is positioned in the light path of the electronic flash 22. When the slider pointer is aligned with the ON indicium, the exposure flash becomes operational and the infrared filter 32 is located out of the light path of the electronic flash 22.

The camera and flash device which is so constituted as described above operates as follows. When the brightness of the scene is low, the slider 40 on the movable member is moved by the operator to its ON position as shown in FIG. 1. The electric switch 34 is thus closed and enables the exposure flash charging circuit 36, and, in addition, the infrared filter 32 is moved out of the light path of the electronic flash. If desired, the movement of the infrared filter out of the light path can be done automatically in response to ambient light measurements, as previously mentioned.

Within a short time, the exposure flash charging circuit 36 will have had sufficient time to energize so as to be capable of delivering an exposure flash. This condition is exhibited to the operator by a ready light (not shown).

When the operator depresses the body release button 28, the flash ranging circuit causes the electronic flash 22 to generate a flash of light substantially smaller in magnitude than an exposure flash. A portion of the light from the flash is reflected back toward the camera 10 by the subject. The reflected light passes through infrared filter 20, onto the light sensitive device 18. Because it would be costly to use a photosensitive cell that matches precisely the transmissive response curve of infrared filter 32, it would be more appropriate as a practical matter to use an infrared filter 20, in front of the light sensitive device 18, that approximates, but does not actually match the transmissive characteristics of infrared filter 32. This approximation is necessary because infrared filters are seldom 100 percent transmissive (or 0% transmissive in the cutoff area) and therefore would require some slight extra width of the "transmissive notch" in the infrared filter positioned in front of the light sensitive device. Use of this type of filter would be required to insure substantially the same response by the light sensitive element to reflected scene light with or without filter 32 positioned in front of the electronic flash 22. It should be understood that the same results may be obtained by the use of appropriate compensation circuits connected to the light sensitive device and activated by movement of the filter 32. A further alternative would be to increase the output of the flash tube during ranging when the infrared filter 32 is in the light path.

The quantity of light reflected by the scene is measured by the flash ranging circuit 30, which in turn translates the information into ranging information which can be used to provide a visible range readout or to adjust the camera accordingly. Thereupon, the exposure flash is fired. If desired, the appropriate amount of flash energy required to properly expose the subject at the known range can be established automatically by the ranging circuit.

When the brightness of the scene is high, i.e. when flash mode photography is not required, the slider 40 on the movable member is positioned so that pointer 41 is aligned with the OFF indicium. The electric switch 34 opens, disabling the exposure flash charging circuit, and, simultaneously, the movable member inserts the infrared filter 32 into the light path of the electronic flash 22.

When the operator depresses the body release 28, intending to use available light for the exposure, the flash ranging circuit 30 once again causes the electronic flash 22 to generate a small flash of light. Substantially all visible light is filtered out by the infrared filter 32, which in turn passes only the infrared radiation. A portion of the infrared light is reflected back from the scene toward the camera, where it is received on the light sensitive device 18. Once again, the quantity of reflected infrared radiation is measured and is used to determine the range of the subject and such information is used to provide a readout and/or to adjust the camera accordingly.

It should be noted that the flash ranging circuit 30 and the charging circuitry associated therewith for energizing the flash must always be enabled while the camera is in the operational mode, but should be disabled when the camera is not in use. Various means for accomplishing this are well known, e.g. the use of a main power switch operated either manually or in response to an act required as an antecedent to making an exposure.

Accordingly, the above-described apparatus allows the operator to take advantage of the autoranging feature of the camera during ordinary available light photography. With the infrared filter positioned in the optical path of the flash light, the distance adjustment of the taking lens is set automatically by the flash ranging circuit without the use of a visible flash of light, which in many situations could prove to have a disruptive effect on its surroundings.

However, when lighting conditions are such that artificial illumination from the exposure flash is required in order to insure that the photograph is properly exposed, use of a visible ranging flash would make little difference.

The invention has been described in detail with particular reference to a preferred embodiment thereof, but it will be understood that variations and modifications can be effected within the spirit and scope of the invention.

Thus it should be understood that even though the specification describes the movement of the infrared filter with respect to a stationary electronic flash, the reverse is also contemplated i.e. the electronic flash unit may activate a switch and move relative to a fixed filter.

What is claimed is:

1. In a photographic camera including:
    an electronic flash device;
    a first circuit for firing the flash device for distance-measuring only;
    a second circuit means for firing the flash device for producing a flash exposure; and
    an infrared filter;
    means providing relative movement between the filter and flash device for allowing said filter and said flash device to be selectively located in and out of alignment with one another, the improvement comprising:
    switch means responsive to said relative movement for enabling the second circuit means when the filter and the flash device are out of alignment and for disabling the second circuit means when the filter means and the flash device are in optical alignment.

2. A photographic camera having an electronic flash device including:
    an infrared distance-measuring means for detecting infrared light from the flash tube that has reflected from a subject and for using such light to provide ranging information; and
    an infrared filter;
    means providing relative movement between the filter and flash device for allowing said filter and said flash device to be selectively located in and out of alignment with one another, the improvement comprising:
    means, including a switch responsive to said relative movement of said filter and flash means so as to move the filter out of said optical path, for energizing the flash means in preparation for the making of flash exposures.

3. The invention according to claim 2 wherein the magnitude of the flash light used for distance measuring is substantially less than the magnitude of the flash light used to make flash exposures.

4. In a photographic camera including:
    an electronic flash device for projecting light along a predetermined light path;
    ranging means for firing said flash device to produce light and for detecting the range of a subject from said camera by sensing light from the flash device that is reflected by the subject to the camera;
    exposure illumination means for firing said flash device to illuminate the subject during an exposure with supplemental illumination for producing a photographic exposure;
    coordinating means for automatically operating said ranging means and said exposure illumination means sequentially; and
    selectively operable disabling means for disabling said exposure illumination means to allow said ranging means to be operated without automatic subsequent operation of said exposure illumination means, the improvement comprising:
    an infrared filter;
    means providing relative movement between the filter and flash device for allowing said filter and said flash device to be selectively located in and out of alignment with one another, the improvement comprising:
    coordinating means responsive to said relative movemet and to said disabling means when said filter and said flash device are in alignment with one another;
    means to preclude operation of the exposure illumination means when the filter and said flash device are in alignment with one another.

* * * * *